United States Patent
Bette

(10) Patent No.: US 6,477,983 B1
(45) Date of Patent: Nov. 12, 2002

(54) BIRD HOUSE WITH DEPLOYABLE FLEDGING BOARD

(76) Inventor: James Robert Bette, 145 Biscayne Dr., Athens, GA (US) 30606

( * ) Notice: Subject to any disclaimer, the term of this patent is extended or adjusted under 35 U.S.C. 154(b) by 0 days.

(21) Appl. No.: 09/888,788

(22) Filed: Jun. 25, 2001

(51) Int. Cl.[7] ............................................... A01K 31/12
(52) U.S. Cl. ..................................................... 119/428
(58) Field of Search ................................ 119/428, 432, 119/467, 468

(56) References Cited

U.S. PATENT DOCUMENTS

| | | | | |
|---|---|---|---|---|
| 4,167,917 A | * | 9/1979 | Noll | 119/23 |
| 4,846,110 A | * | 7/1989 | Reynolds | 119/23 |
| 4,928,631 A | * | 5/1990 | Smith | 119/23 |
| 5,134,970 A | * | 8/1992 | Oh | 119/23 |
| 5,172,651 A | * | 12/1992 | Finn | 119/23 |
| 5,493,997 A | * | 2/1996 | Ritchey | 119/23 |
| 5,746,156 A | * | 5/1998 | Petrides et al. | 119/428 |
| 5,943,981 A | * | 8/1999 | Chrisco | 119/428 |
| 6,009,837 A | * | 1/2000 | McClasky | 119/428 |
| 6,170,437 B1 | * | 1/2001 | Jones | 119/428 |

* cited by examiner

Primary Examiner—Charles T. Jordan
Assistant Examiner—Kimberly S. Smith

(57) ABSTRACT

A birdhouse where breeding pairs of birds build a nest, lay eggs and brood young birds with a fledging board or platform which is deployed just below the entrance hole in order to provide an exercise area for the young birds so that they may test their legs and wings just prior to taking their first flight. During the incubation period and when the young birds are growing up the fledge board is concealed in such a manor that no accouterments are present that would offer a footing to a predator who might otherwise use the board as a staging area to reach inside and raid the nest. The fledge board is deployed only when the young birds emerge from the cramped interior of the nest for the first time allowing them the opportunity to flex their legs and wings before taking their first flight into the world thereby reducing the likelihood of injury or death.

6 Claims, 6 Drawing Sheets

US 6,477,983 B1

BIRD HOUSE WITH DEPLOYABLE FLEDGING BOARD

CROSS-REFERENCE TO RELATED APPLICATIONS

Not Applicable

STATEMENT REGARDING FEDERALLY SPONSORED RESEARCH AND DEVELOPMENT

Not Applicable

REFERENCE TO A MICROFICHE APPENDIX

Not Applicable

BACKGROUND OF THE INVENTION

People like to provide a setting conducive to nesting birds so that they may enjoy their beauty and song or to rid their gardens and fruit trees of insects. They accomplish this by fencing in areas of their property so that cats and other predators cannot encroach, by planting fruit trees and plants that produce food and nectar that birds are attracted to, and by setting out feeders and nesting materials to encourage the desired behavior. To encourage cavity nesters such as Chickadees, Finches, Sparrows, and Bluebirds to name a few, people provide them with birdhouses.

Because the size of these cavity nesters differ so greatly, birdhouses come in a wide variety of designs. Patents such as U.S. Pat. Nos. 6,170,437 and 5,269,255 address the concept of regulating the volume of the birdhouse to accommodate the size of the occupants. U.S. Pat. Nos. 5,746,156 and 4,167,917 relate to varying the size of the entrance hole. Other patents are concerned with protecting the newly laid eggs and/or newly hatched chicks from raids by predators, a problem that recent research has shown, is more prevalent than previously known however, any design that departs significantly from a natural cavity normally found in the wild may discourage birds from investigating the contraption for use as a nesting site. The two simplest design considerations in a birdhouse to discourage predation are 1) limiting the size of the entrance hole so that it is just large enough to allow ingress by the specie of bird desired and 2) leaving the entrance side of the bird house devoid of any accouterments that could give a predator a footing relying instead on the nimbleness and agility of the breeding pair to gain entry.

Because birds are not particular, they will nest in almost any structure but several universal features of a birdhouse have been identified as beneficial to these homemakers, whether built by a hobbyist or purchased in a store: 1) It should be generally water tight and shed water in a storm. 2) It should be well ventilated. 3) It should be constructed so that it can be cleaned after each nesting season and 4) It should provide protection from predators and parasites.

Nothing in the prior art has addressed the plight of the nestling ready to fledge. Imagine being huddled together with up to seven brothers and sisters in a dark cramped enclosure without enough room to even air out their partially feathered wings and then, when they reach adolescence and with no exercise or training, be expected to mount the entrance hole which can be up to fifteen feet in the air, and fly! for the first time! and land safely for the first time! Many young birds do not accomplish this feat, miss their mark, are injured, and die. Accordingly, the following described invention substantially departs from the prior art and describes a unique deployable fledging board designed to allow fledglings the opportunity to exercise and train outside the nest just prior to flying into the world.

BRIEF SUMMARY OF THE INVENTION

This invention relates to a deployable platform that, when erected, provides a brief training area for young birds just prior to their first flight into the world. Accordingly, several objects and advantages of this invention are:

(a) to decrease the mortality rate among newly hatched birds (b) to increase the enjoyment and pleasure of bird house providers

DETAILED DESCRIPTION OF THE INVENTION

Birdhouses are made in a myriad of designs and sizes and from every material imaginable including wood, concrete, clay, ceramic, metal, plastic, composites, and combinations of all these materials. The preferred embodiment of the birdhouse described here is made of wood, by far the most common material used for this purpose and therefore the easiest to understand. Any type of exterior grade wood can serve the purpose including cedar, pine and plywood to name a few. Cavity nesting birds can be as small as a Black-Capped Chickadee or as large as a Barred Owl. The following description of a birdhouse in general terms illustrates design features common to all birdhouses however, some aspects such as inside volume and size of the entrance hole, as well as some others, should be individualized to the specific requirements of the species attempting to be attracted. Information of this type is readily available from birding supply stores, the Internet, etc.

Figure 3:
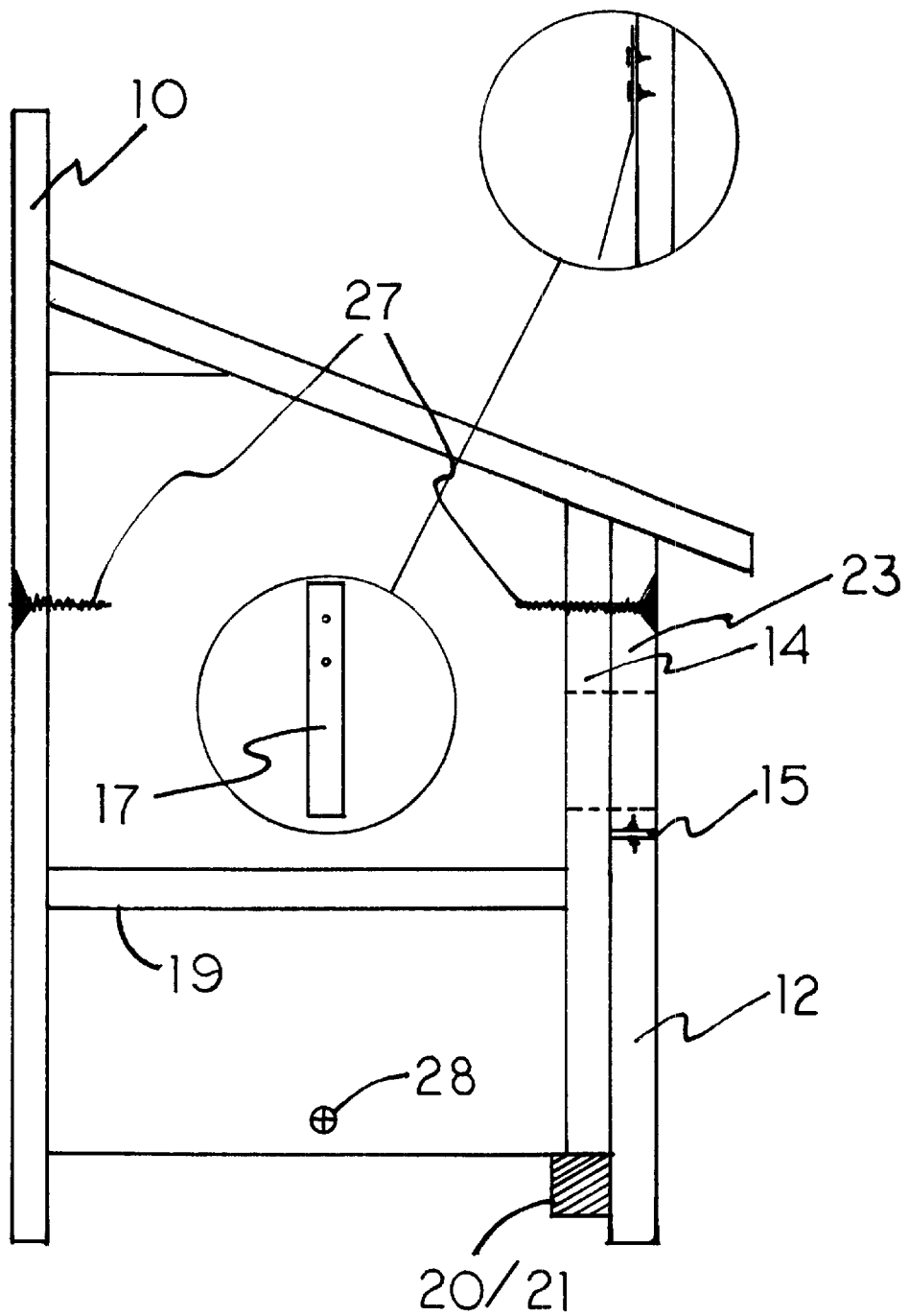
FIG. 3. Side view of birdhouse with fledge board inactive.
Figure 4:
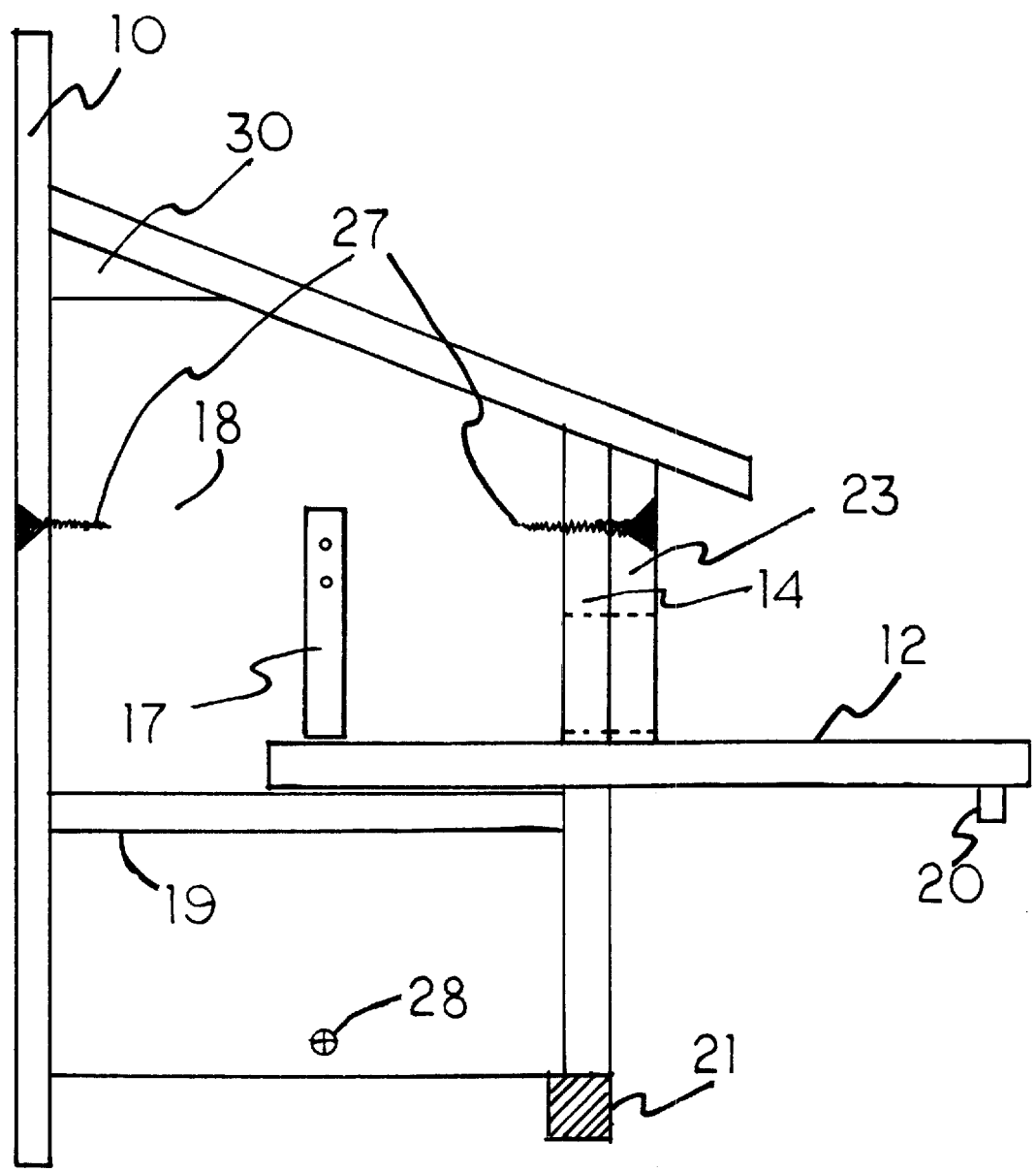
FIG. 4. Side view of birdhouse with fledge board inactive.
Figure 5:
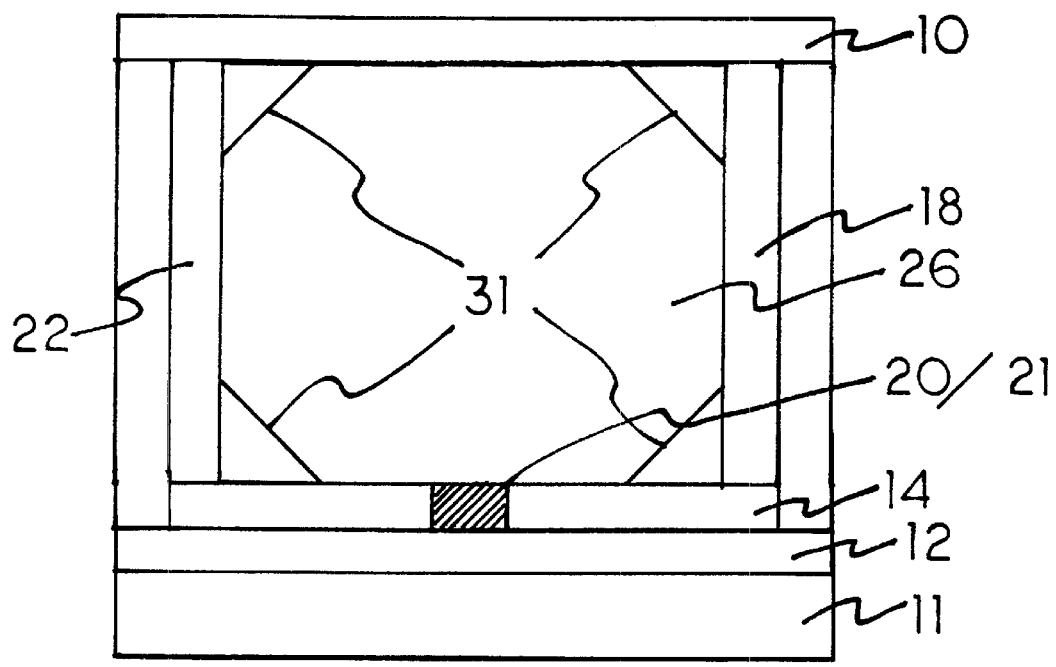
FIG. 5. Bottom view of birdhouse with fledge board inactive.
Figure 7:
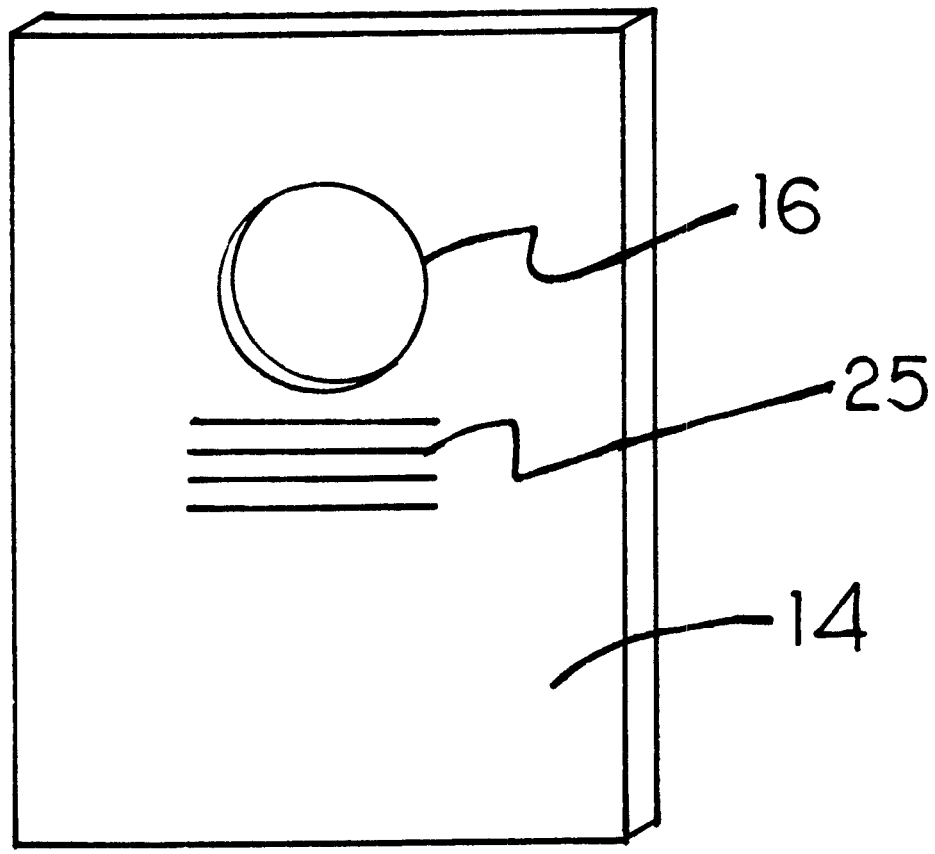
FIG. 7. Interior view of birdhouse front.

FIG. 3 is a side view of a typical birdhouse. Top 11, and side 22 (not shown) and bottom 26 (not shown) are fastened to Back 10 with galvanized or otherwise exterior grade staples, nails or screws. Back 10 is also predrilled with Mounting Holes 24 which can be used to mount the birdhouse to a structure or tree. Front 14 is fastened to top 11 and side 22 (not shown) and bottom 26 (not shown) in like manner and to side 18 with a galvanized wood screw that will act as a hinge and be explained later. Since the four corners created by the connection of the two sides and the front and the back all form 90 degree angles, the birdhouse is now shaped like a box. FIG. 4 shows a side view with fledge board 12 fully deployed. Entrance hole extender 23 is fastened to the upper part of front 14 and the desired diameter entrance hole is drilled here. Entrance hole extender 23 elongates the depth of the entrance hole from a single width of wood to a double width. This has the effect of making it more difficult for a predator to reach inside the cavity and extract incubating eggs or chicks. Side 18 and opposite side 22 (not shown) are cut back at the tops to form ventilation holes 30 to allow the free passage of air into and out of the interior of the birdhouse. FIG. 5 shows a bottom view of the birdhouse. Here the four corners 31 are cut back to allow any water that may enter the birdhouse to drain out and to promote fresh air movement to the interior of the birdhouse. FIG. 7 shows the interior view of front 14. Just below the entrance hole several shallow saw cuts are made to form Saw Cut Ladder 25 which serves the purpose of giving the fledgling chicks a footing or toe hold once they have decided to exit the nest.

Figure 1:
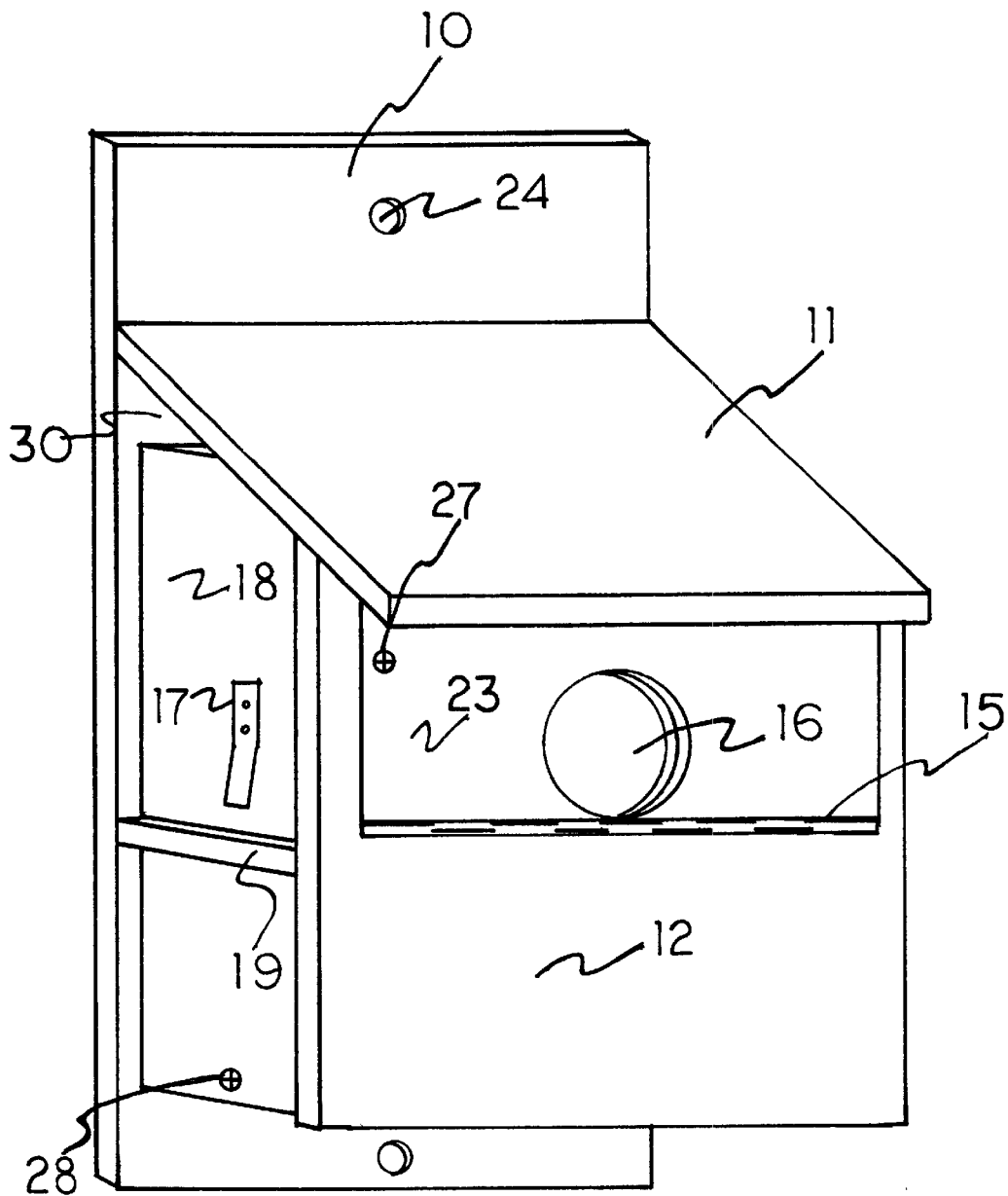
FIG. 1. Front view of birdhouse with fledge board inactive.
Figure 2:
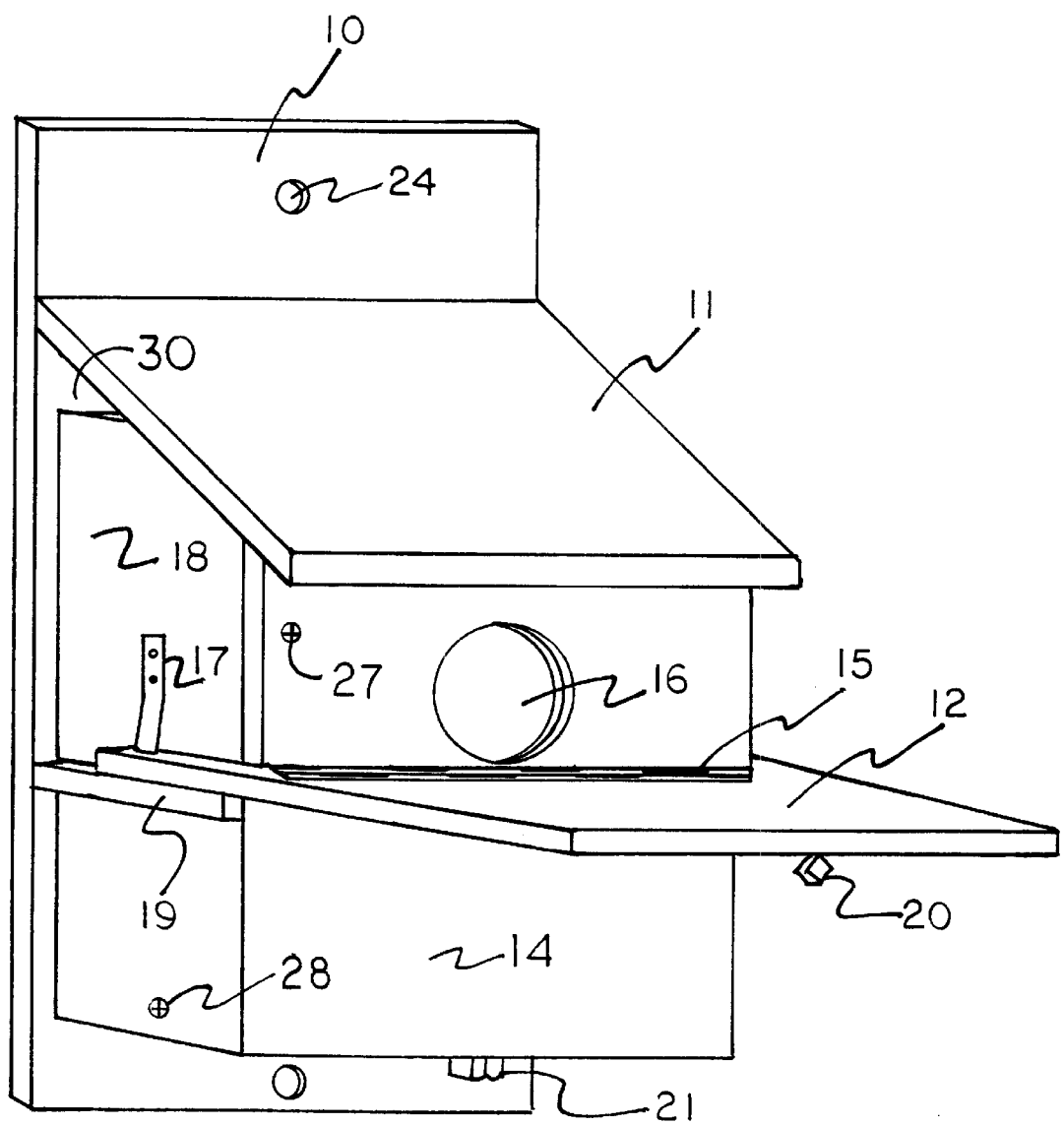
FIG. 2. Front view of birdhouse with fledge board deployed.
Figure 6:
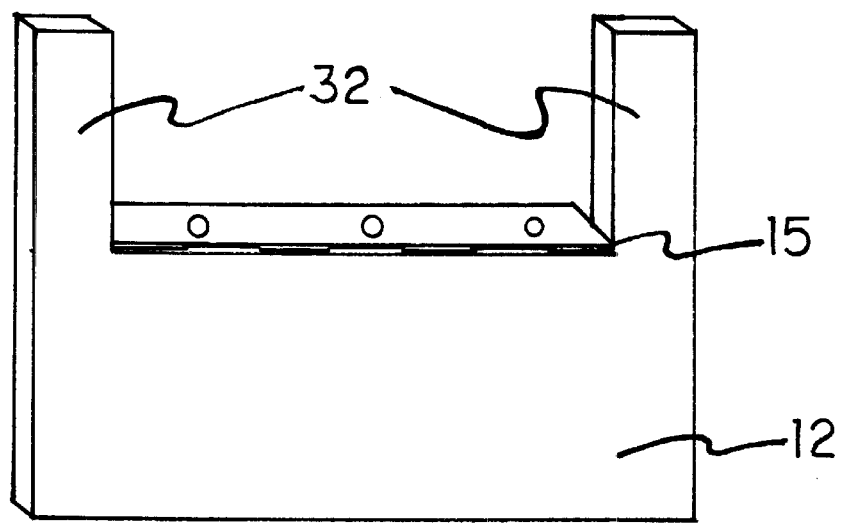
FIG. 6. Fledge board.

The Fledge Board FIG. 6, is an independent appendage and is not a component of the birdhouse. It consists of a flat Platform Area 12 notched out at one end forming two Stanchion Legs 32 on each side of the notch. Platform Area 12 should be large enough for several cavity nesting fledgling chicks to occupy the area simultaneously with sufficient area around them so that if they were to vigorously exercise their wings they would not interfere with each other or the structure of the birdhouse and at least one Stanchion Leg 32 should be long enough to engage Sprig Steel Retainer 17 as shown on FIG. 2. Also shown in FIG. 2 is Entrance/Exit Hole 16 which is sized according to the bird that is attempting to be attracted. When deployed, Platform Area 12 should rest just below Extrance/Exit hole 16. Piano Hinge 15 is a commercially available hinge which can be purchased from a wide variety of suppliers. It should be made of stainless steel, brass, plastic or other material designed for outdoor use. One leaf of the hinge is screwed onto Fledge Board 12 at the notch area being certain that the overall width of Piano Hinge 15 does not exceed the overall width of the wood it is being fastened to. As long as the width of Piano Hinge 15 does not exceed the width of the wood it is being fastened to, it will not protrude past the surface of Fledge Board 12 and therefore will not offer a footing to a potential predator. The other leaf of Piano Hinge 15 is fastened to the bottom of Entrance Hole Extender 23 and as seen in FIG. 3 forms a flush surface at the front of the birdhouse when in its collapsed or inactive configuration, offering no footing for a potential predator. To insure that Fledge Board 12 remains upright and inactive when not in use a two piece Fledge Board Catch is mounted to Bottom 26 and Fledge Board 12. Fledge Board Catch can be any type of catch similar to those that hold a cabinet door closed and available from many trade sources. A typical design consists of a two part strike and roller catch where the strike spreads the spring loaded rollers apart when closed holding it firmly in place until forcefully withdrawn FIG. 3 shows Fledge Board Strike 20 and Fledge Board Roller 21 co-joined when the Fledge Board is in an inactive or undeployed configuration. FIG. 4 shows Fledge Board Strike 20 mounted to the under side of Fledge Board 12 and Fledge Board Roller 21 mounted to Bottom 26 when Fledge Board 12 is in an active or deployed configuration.

FIG. 3 shows a side view of Spring Steel Retainer 17 which is a straight piece of metal spring steel slightly deformed or bent about its midpoint. Spring steel is a common commodity available from many industry sources. FIG. 3 also shows Spring Steel Retainer 17 being screwed to Left Side 18 in two places insuring that it will not turn or move out of place even if one or both screws become loose. To erect the Fledge Board the birdhouse provider or other interested observer should grasp Fledge Board 12 at the bottom and pull outwards disengaging Fledge Board Strike 20 from Fledge Board Roller 21 and deploying the board around the axis formed by the pin in Piano Hinge 15 into a generally horizontal position. As Stanchion Leg 32 passes over the deformed section of Spring Steel Retainer 17 it will compress the retainer into a flat configuration. Just as it passes the bottom of the retainer the memory in the bent metal will return and the end of the retainer will protrude over a part of Stanchion Leg 32 and retain the board just as it stops against Fledge Board Stop 19. FIG. 2 shows Fledge Board Stop 19 which is a strip of wood fastened to and protruding out from Left Side 18. Now the Fledge Board 12 is in a stationary position and cannot be moved downward because it is held by Spring Steel Retainer 17 and it cannot be moved any further upward because it rests against Fledge Board Stop 19.

FIG. 3 shows Clean Out Side Hinge Pins 27, one of which is drilled through Back 10 and the second of which is drilled through Front 14 and Entrance Hole Extender 23 respectively and directly opposite each other. Since no other fasteners of any sort have been installed through front 14, Back 10 or Top 11 into Side 18, simply by backing out or removing Clean Out Side Retainer Screw 28, Hinge Pins 27 act as hinges allowing side 18 to be pivoted around the axis formed by the opposing pins so that the birdhouse can be opened at the bottom in order to remove any old nests or other debris such as bee hives.

In practice, early in the Springtime birdhouses are provided in areas where cavity nesters are encouraged to make their homes, usually on the premises of a residence. Ideal locations are shaded areas secure from feral cats and other predators and usually mounted to a tree. Although not always the ideal location, they may also be mounted where the residents have a clear view of the birdhouse in order to enjoy the hatching cycle. Once chosen as a nesting site, the breeding pair can be seen making frequent trips to the birdhouse with nesting materials. After the nest is built and eggs lain, the only observable activity will be when the male partner brings food to the brooding female partner at least for most species of cavity nesters. Once the eggs are hatched, both parents make frequent trips through the entrance hole as the young are reared. Several days before hatching the young chicks will appear at the entrance hole and begin sticking their heads out to observe their surroundings and their almost mature chirping is much louder now. At this time the interested observer should grasp the bottom of Fledge Board 12 and forcefully disengage Fledge Board Strike 20 from Fledge Board Roller 21 and lift the device to a horizontal position as Stanchion Leg 32 passes Spring Steel Retainer 17 and resting at Fledge Board Stop 19 holding it firmly in place. Though the parents may be surprised at the new appendage when they first arrive back to the nest, they will quickly become accustomed to the Fledge Board and continue feeding their young. When ready the young chicks will occupy the device and use it as an exercise platform testing their legs as well as their wings, possibly several at a time, until they feel confident enough to take their first flight. After all the young birds have left, the nest should be reconfigured or stored away for the next season. Because, in some parts of the country, more than one nest is made by a breeding pair, the birdhouse provider should now depress Spring Steel Retainer 17 against Side 18 allowing Fledge Board 12 to rotate around an axis at Piano Hinge 15 resuming a vertical position and forcing Fledge Board Strike 20 back into Fledge Board Roller 21 thereby removing the possibility that it could be used as a footing by a predator and returning the bird house to its original configuration where a new clutch of eggs may be brooded.

Accordingly, the reader can see that by using this unique device the chances for hatching to achieve a successful departure from their nest are greatly improved and the enjoyment of the birdhouse provider significantly enhanced.

Although the description above contains many specificity's, these should not be construed as limiting the scope of the invention but merely providing illustrations of one of the presently preferred embodiments of this invention. For example a retrofit kit could be designed to fit many existing birdhouses. Thus the scope of the invention should be determined by the appended claims and their legal equivalents, rather than by the examples given.

I claim:

1. A generally weather-tight breeding house for birds comprising;
    a top, back, front, sides and a bottom;
    an entrance hole, the interior space between the bottom of the breeding house and the entrance hole being unobstructed to permit fledgling birds to mount the entrance hole;
    an external platform;
    means for supporting said platform in a horizontal position below the entrance hole to allow for young birds about to fledge a readily accessible place to exercise and test their flying capabilities, said platform being moveable from said horizontal position so as to not offer a footing to a potential predator when not in use for birds about to fledge.

2. A breeding house for birds as set forth in claim 1 including a footing aid within the breeding house and adjacent the entrance hole to assist fledgling birds to mount the exit hole.

3. A generally weather-tight breeding house for birds comprising;
    a top, back, front, sides and a bottom;
    an entrance hole;
    a platform;
    means for supporting said platform below the entrance hole;
    wherein said platform is pivotably attached below the entrance hole having a deployed position in which the platform is horizontal allowing for young birds about to fledge a place to exercise and test their flying capabilities and an inactive position in which the platform is vertical and flush with the entrance hole so as to not offer a potential footing to a predator when not in use for birds about to fledge.

4. A breeding house for birds as set forth in claim 3 in which said means for supporting the platform is a hinge about which the platform can pivot from a horizontal to a vertical position.

5. A breeding house for birds as set forth in claim 4 including a disengageable retainer for engaging said platform while in a horizontal position.

6. A breeding house for birds as set forth in claim 5 in which said retainer is made of spring steel.

* * * * *